United States Patent
Filev et al.

(10) Patent No.: US 9,973,872 B2
(45) Date of Patent: *May 15, 2018

(54) SURROUND SOUND EFFECTS PROVIDED BY CELL PHONES

(71) Applicant: Google LLC, Mountain View, CA (US)

(72) Inventors: Momchil Filev, Novi, MI (US); Martin Brandt Freund, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/442,753

(22) Filed: Feb. 27, 2017

(65) Prior Publication Data

US 2017/0238115 A1 Aug. 17, 2017

Related U.S. Application Data

(60) Continuation of application No. 15/009,706, filed on Jan. 28, 2016, now Pat. No. 9,584,945, which is a continuation of application No. 14/242,693, filed on Apr. 1, 2014, now abandoned, which is a division of application No. 13/629,204, filed on Sep. 27, 2012, now Pat. No. 8,712,328.

(51) Int. Cl.
*H04W 4/02* (2018.01)
*H04S 7/00* (2006.01)

(52) U.S. Cl.
CPC .............. *H04S 7/30* (2013.01); *H04W 4/023* (2013.01)

(58) Field of Classification Search
CPC ....... H04W 28/14; H04W 4/00; H04W 4/023; H04W 88/02
See application file for complete search history.

(56) References Cited

U.S. PATENT DOCUMENTS

| | | |
|---|---|---|
| 6,487,296 B1 | 11/2002 | Allen et al. |
| 7,747,338 B2 | 6/2010 | Korhonen |
| 8,000,742 B2 | 8/2011 | de Leon et al. |
| 8,072,905 B2 | 12/2011 | Haff et al. |
| 8,712,328 B1 | 4/2014 | Filev et al. |

(Continued)

FOREIGN PATENT DOCUMENTS

EP   1615464 A1   11/2006

OTHER PUBLICATIONS

"How to tune your speakers using Trueplay," at https://www.sonons.com/home, last visited Mar. 30, 2017.

(Continued)

*Primary Examiner* — Diane Mizrahi
(74) *Attorney, Agent, or Firm* — Dority & Manning, P.A.

(57) ABSTRACT

Systems and methods that reproduce surround sound effects from an audio source are described. Wireless communication devices form a wireless network in which music, for example, can be played on the speakers of the wireless communication devices to reproduce surround sound effects from a selected audio source. As the wireless communication devices roam with respect to each other or with respect to a focal point or listening position of the wireless network, the wireless network adjusts how the audio source is played at each speaker of the respective wireless communication device to maintain or to enhance the reproduction of surround sound effects from the audio source.

17 Claims, 3 Drawing Sheets

(56) References Cited

U.S. PATENT DOCUMENTS

| | | |
|---|---|---|
| 9,584,945 B2* | 2/2017 | Filev .................. H04S 7/30 |
| 2005/0135634 A1 | 6/2005 | Wu |
| 2008/0085676 A1 | 4/2008 | Huang |
| 2008/0181425 A1 | 7/2008 | Suber |
| 2009/0172583 A1 | 7/2009 | Want et al. |
| 2010/0041330 A1 | 2/2010 | Elg |
| 2010/0054508 A1 | 3/2010 | Yang |
| 2013/0156198 A1 | 6/2013 | Kim et al. |
| 2014/0213226 A1 | 7/2014 | Filev et al. |
| 2014/0328505 A1 | 11/2014 | Heinemann et al. |
| 2016/0150344 A1 | 5/2016 | Filev et al. |

OTHER PUBLICATIONS

"Selecting a location for your Sonos speakers," at http://www.sonos.com/home, last visited Mar. 30, 2017.

"Smart speaker—Wikipedia, the free encyclopedia," at https://en.wikipedia.org/wiki/Smart_speaker, last visited Mar. 30, 2017.

"Sonos—Wikipedia, the free encyclopedia," at https://en.wikipedia.org/wiki/Sonos, last visited Mar. 30, 2017.

"Sonos Trueplay Brings Simple Speaker Tuning to Millions of Rooms Around the World," at http://press-us.sonons.com/presskit, last visited Mar. 30, 2017.

"The Home Sound System," at http://www.sonons.com/en-us/streaming-music, last visited Mar. 30, 2017.

"Trueplay Speaker Tuning Software Sonons," at https://sonos.custhelp.com/app/answer/detail/a_id/3555, last visited Mar. 30, 2017.

* cited by examiner

SURROUND SOUND EFFECTS PROVIDED BY CELL PHONES

CLAIM OF PRIORITY

This is a Continuation Application of U.S. application Ser. No. 14/242,693, filed on Apr. 1, 2014, which is a divisional application of U.S. patent application Ser. No. 13/629,204, filed on Sep. 27, 2012, each of which is incorporated by reference herein in its entirety.

BACKGROUND

A conventional phone is a ubiquitous entertainment device that can be used to play music through a speaker integrated with the phone housing. However, the speaker has a limited range due to its limited volume and is not ideal for playing music.

Further limitations and disadvantages of conventional and traditional approaches will become apparent to one of skill in the art through the comparison of such systems with some aspects of some embodiments according to the present disclosure as set forth in the remainder of the present application with reference to the drawings.

BRIEF SUMMARY

Aspects of the disclosure relate to using speakers of wireless communication device such as, for example, cell phones to reproduce surround sound effects from an audio source.

An example embodiment provides a method of providing surround sound. The method can include, for example, one or more of the following: sending, by a master device, first surround sound signals of an audio source to a first cell phone of the plurality of cell phones, wherein the master device is one of the plurality of cell phones that form a wireless network to reproduce surround sound effects of the audio source; sending, by the master device, second surround sound signals of the audio source to a second cell phone of the plurality of cell phones; monitoring, by the master device, locations of the first cell phone and the second cell phone relative to the master device; determining, by the master device, suggested locations where the first cell phone and the second cell phone can be placed to enhance the surround sound effects; and dynamically adjusting, by the master device, at least one of the first surround sound signals, the second surround sound signals and third surround sound signals of the audio source as the relative location of at least one of the first cell phone, the second cell phone, and the master device changes, wherein the third surround sound signals are played by the master device.

An example embodiment provides a cell phone. The cell phone can include, for example, a memory and a processor in which the processor is operatively coupled to the memory. The processor can be configured to determine a master device from a plurality of cell phones in a wireless network; send a first surround sound channel of an audio source to a first cell phone of the plurality of cell phones; send a second surround sound channel of the audio source to a second cell phone of the plurality of cell phones; synchronize playing of the first surround sound channel by the first cell phone, the second surround sound channel by the second cell phone, and a third surround sound channel by the master device to reproduce surround sound effects of the audio source; monitor locations of the first cell phone and the second cell phone; determine suggested locations where the first cell phone and the second cell phone should be placed to enhance the surround sound effects; and dynamically adjust at least one of the first surround sound channel, the second surround sound channel and the third surround sound channel as the location of at least one of the first cell phone and the second cell phone changes.

An example embodiment provides a system that reproducing surround sound from an audio source. The system can include for example a wireless network. The wireless network can include, for example, a first phone, a second phone, and a third phone. The first phone is a master device. The master device sends first surround sound signals of the audio source to the second phone and second surround sound signals of the audio source to the third phone. The master device synchronizes the playing of the first surround sound signals by the second phone, the second surround sound signals by the third phone, and third surround sound signals by the master device to reproduce surround sound effects of the audio source. The master device monitors positions of the first phone and the second phone as the first phone and the second phone roam. The master device determines suggested locations where the first phone and the second phone should be placed to enhance the surround sound effects. The master device dynamically adjusts at least one of the first surround sound signals, the second surround sound signals and the third surround sound signals as the positions of at least one of the first phone, the second phone, and the master device changes.

These and other advantages, aspects and novel features of the present disclosure, as well as details of an illustrated embodiment thereof, will be more fully understood from the following description and drawings.

DETAILED DESCRIPTION

Aspects of the disclosure relate to systems and method for providing surround sound effects. In an example embodiment, a plurality of wireless communication devices such as, for example, cell phones are wirelessly linked to reproduce surround sound effects from an audio source.

Figure 1:
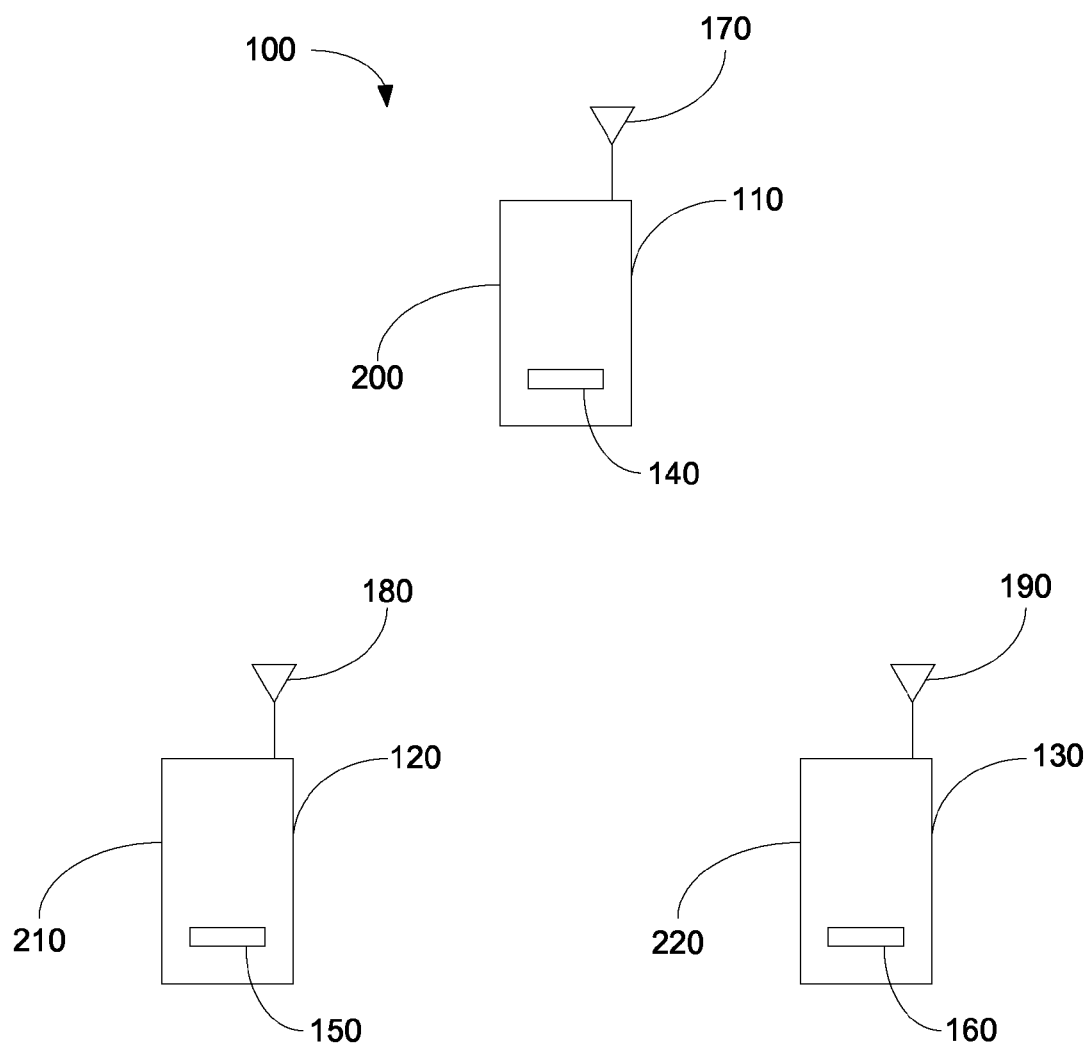
FIG. 1 illustrates an example embodiment of a system that provides surround sound effects from an audio source using a plurality of wireless communication devices.

FIG. 1 illustrates an example embodiment of a system 100 that provides surround sound effects using a plurality of wireless communication devices. Referring to FIG. 1, the wireless communication devices 110, 120, 130 are located at different positions in a room, for example. Although illustrated as three wireless communication devices 110, 120, 130 in FIG. 1, an example embodiment can have more or less than three wireless communication devices.

The three wireless communication devices 110, 120, 130 can be or include, for example, one or more of the following: smart phones, mobile phones, cellular smart phones, cellular devices, mobile cellular devices, handheld cellular devices, cellular phones, handheld wireless communication devices, mobile wireless communication devices, wireless phones, mobile wireless phones, wireless handsets, mobile wireless handsets, computing tablets, wireless computing tablets, personal digital assistants (PDAs), laptop computers, wireless laptop computers, notebook computers, wireless notebook computers, computers, wireless computers, computing devices, wireless speakers, speakers, etc. In an example embodiment, wireless communication devices can be configured to provide wired or wireless communication.

Each of the wireless communication devices 110, 120, 130 has one or more respective speakers 140, 150, 160 and one or more respective antennas 170, 180, 190. In an example embodiment, the respective speakers 140, 150, 160 are integrated with the corresponding housings 200, 210, 220 of the wireless communication devices 110, 120, 130. In another example embodiment, one or more of the respective speakers 140, 150, 160 can be external speakers that are wirelessly or wiredly linked to the corresponding wireless communication device 110, 120, 130.

In an example embodiment, each of the wireless communication devices 110, 120, 130 can communicate with a plurality of wireless networks. For example, the wireless communication devices 110, 120, 130 can communicate over one or more of the following: cellular network (e.g., cellular voice and/or data network), a Bluetooth network (e.g., a piconet), an IEEE 802.11 network (e.g., an IEEE 802.11a, b, g, and/or n network), a personal access network, a WIFI network, a location-determining network, a global positioning network, etc.) In an example embodiment, each of the wireless communication devices 110, 120, 130 can communicate over a cellular network (e.g., a 3G or 4G network) and at least one of a Bluetooth network and an IEEE 802.11 network. In addition, in an example embodiment, each of the wireless communication devices 110, 120, 130 can also determine its position via a global positioning network, or other location-determining network.

In operation, one or more of the wireless communication devices 110, 120, 130 initiate the setup of the system 100 for providing surround sound effects. The three wireless communication devices 110, 120, 130 form a wireless network using a wireless communication standard. In an example embodiment, the three wireless communication devices 110, 120, 130 form a Bluetooth network (e.g., a piconet) and the wireless communication devices 110, 120, 130 are synchronized with each other. For example, the wireless communication devices 120, 130 can be synchronized with the wireless communication device 110 (e.g., a master device in the Bluetooth network).

In an example embodiment, one of the wireless communication devices 110, 120, 130 becomes a master device 110 and controls the surround sound effects played by the wireless communication devices 110, 120, 130. The determination of the master device 110 can be based on the wireless communication standard or can be selected by a user, for example.

The master device 110 can select a particular audio source from a list (e.g., a playlist) of audio sources on a display, for example, of the master device 110. For example, the audio source can be a particular piece of music, a particular song, a particular movie, a particular movie soundtrack, a particular video, etc. In an example embodiment, the audio source can be stored on the master device 110 as a file, for example, or can be accessed (e.g., wirelessly accessed) by the master device 110 from a server (e.g., an external server accessible via an external network such as the Internet) or one of the other wireless communication devices 120, 130. When accessing the audio source from the server or one of the other wireless communication devices 120, 130, the master device 110 can download the audio source (e.g., the entire file) or a portion thereof. In an example embodiment, the master device 110 can wirelessly stream the audio source from the source or one of the other wireless communication devices 120, 130. The streaming can be achieved, for example, via the cellular network, Bluetooth network or IEEE 802.11 network that is connected, for example, to the Internet or some other network.

Once the wireless network of the three wireless communication devices 110, 120, 130 is formed, the master device 110 determines the position (e.g., a relative position with respect to the master device 110 or an audio focal point of the system 100) of the wireless communication devices 110, 120, 130. Positioning can be determined via global positioning signals or by received signal strength, for example. In an example embodiment, the master device 110 is positioned at a listener location or a focal point (e.g., the sound "sweet spot") of the sound system (e.g., the system 100). In another example embodiment, the master device 110 and the other wireless communication devices 120, 130 are positioned with respect to a listener location or focal point of the sound system that is different from the position of the wireless communication devices 110, 120, 130.

Once the position of the wireless communication devices 120, 130 is determined, the master device 110 determines which portions of the surround sound signals of the selected audio source are to be played on which speakers 140, 150, 160 of corresponding wireless communication device 120, 130. For example, for a particular audio source, there may be a plurality of channels that make up the surround sound signals. The master device 110 determines which of the channels is to be played by which of the wireless communication devices 110, 120, 130. The master device 110 then transmits (e.g., wirelessly transmits via Bluetooth communications) the respective channels of the surround sound signals to the corresponding wireless communication devices 120, 130. The master device 110 can also determine which of the channels it will play. By controlling which channels are played by which wireless communication device 110, 120, 130 and by controlling volume, for example, the master device 110 can coordinate the playing (e.g., the synchronized playing) of the audio source through the wireless communication devices 110, 120, 130 to reproduce surround sound effects of the audio source being played.

As the wireless communication devices 110, 120, 130 roam around the room, for example, the master device 110 can determine the position of the wireless communication devices 110, 120, 130 and dynamically adjust which portions of the surround sound signals are played by which wireless communication devices 110, 120, 130.

In addition, when wireless communication devices can be added or removed from the Bluetooth network, the master device 110 can dynamically adjust which portions of the surround sound signals are played by which wireless communication devices.

In an example embodiment, the selected audio source can include one or more surround sound versions that can be selected by the user of the master device 110, for example, or can be automatically selected by the master device 110 in view of the number and position of wireless communication devices in the Bluetooth network. Thus, for example, for a particular movie that is selected, there may be different versions such as, for example, a stereo channel version, a screen channel version, an x.0 version (e.g., a 2.0 stereo version), an x.1 version (e.g., a 5.1 surround sound version), an x.2 version (e.g., a 10.2 surround sound version), etc. The master device 110 can determine or select which version of the particular movie, for example, can be played by the wireless communication devices in the Bluetooth network. In addition, as conditions in the Bluetooth network change, for example, as wireless communication devices are added or removed or moved, the master device 110 can adjust to a different version of the particular movie, for example, to be played by the wireless communication devices. For example, if the number of wireless communication devices in the Bluetooth network decreases, the master device 110 can adjust to a surround sound version of the audio source that has fewer surround sound channels.

In an example embodiment, the master device 110 can also modify the channels of the surround sound signals. For example, the master device 110 can combine different surround sound channels so that the combined surround sound channels can be played on a particular wireless communication device. For example, if a wireless communication device is removed from the Bluetooth network that is playing the audio source, then the master device 110 can combine two surround sound channels to be played at one wireless communication device or to spread a surround sound channel over one or more wireless communication devices. In an example embodiment, the wireless communication devices 110, 120, 130 might roam because one or more of the wireless communication devices 110, 120, 130 are in the pockets of the users, for example.

Figure 2:
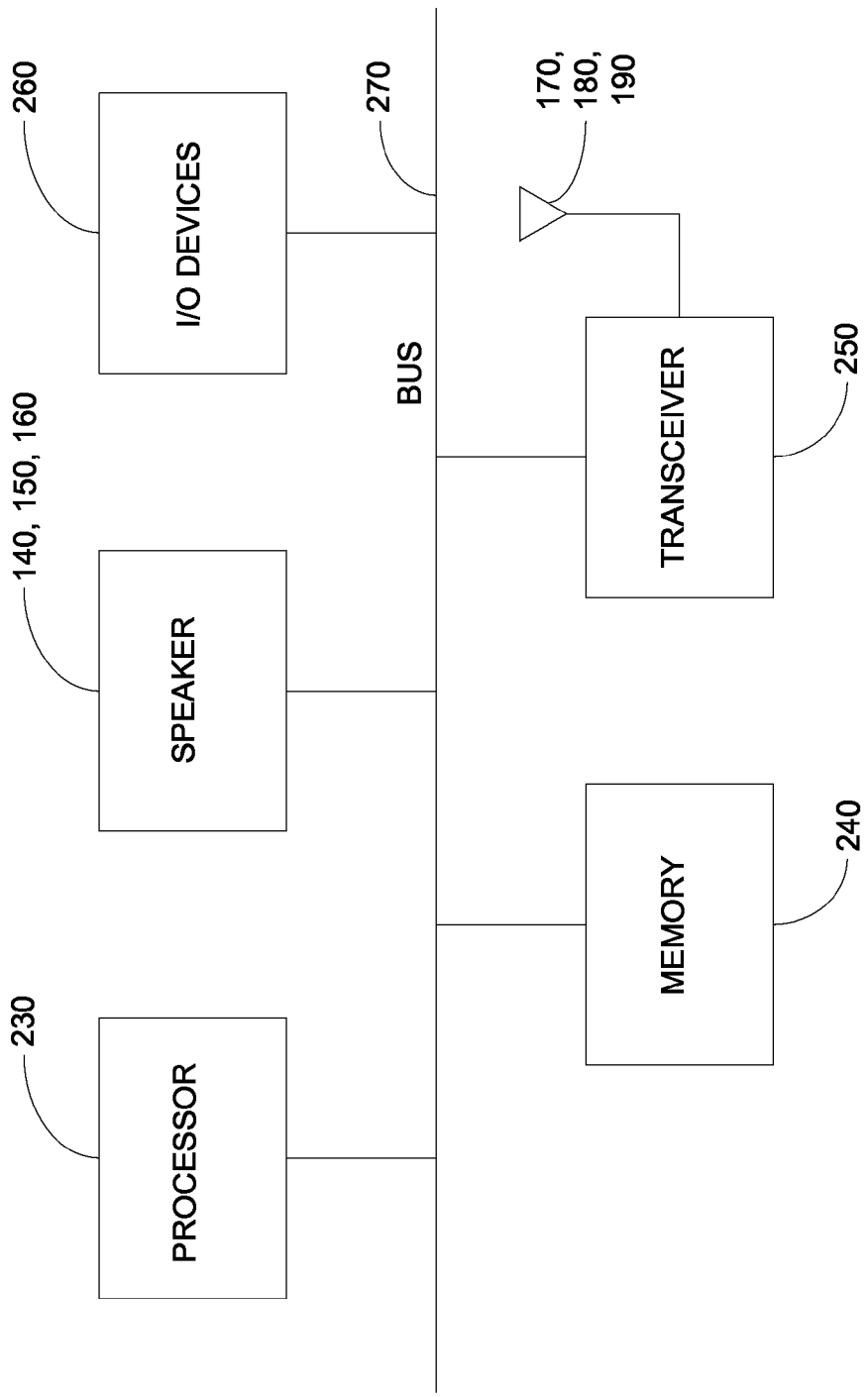
FIG. 2 illustrates some of the components of an example embodiment of a wireless communication device.

Referring to FIG. 2, an example embodiment of a wireless communication device 110, 120, 130 is illustrated. The wireless communication device 110, 120, 130 includes, for example, a processor 230, a memory 240, a transceiver 250, the speaker 140, 150, 160, other input/output (I/O) devices 260, and a bus 270. The processor 230, the memory 240, the transceiver 250, the speaker 140, 150, 160, and the other I/O devices are coupled to the bus 270. Thus, the various components can communicate with each other via the bus 270. The transceiver 250 is coupled to the antenna 170, 180, 190. Although illustrated as single components, an example embodiment can have multiple instances of each component. For example, there can be one or more transceivers 250 (e.g., one or more of a Bluetooth transceiver, a cellular transceiver, an IEEE 802.11 transceiver, and a global positioning system receiver) coupled to one or more antennas 170, 180, 190 in one of the wireless communication devices 110, 120, 130.

Figure 3:
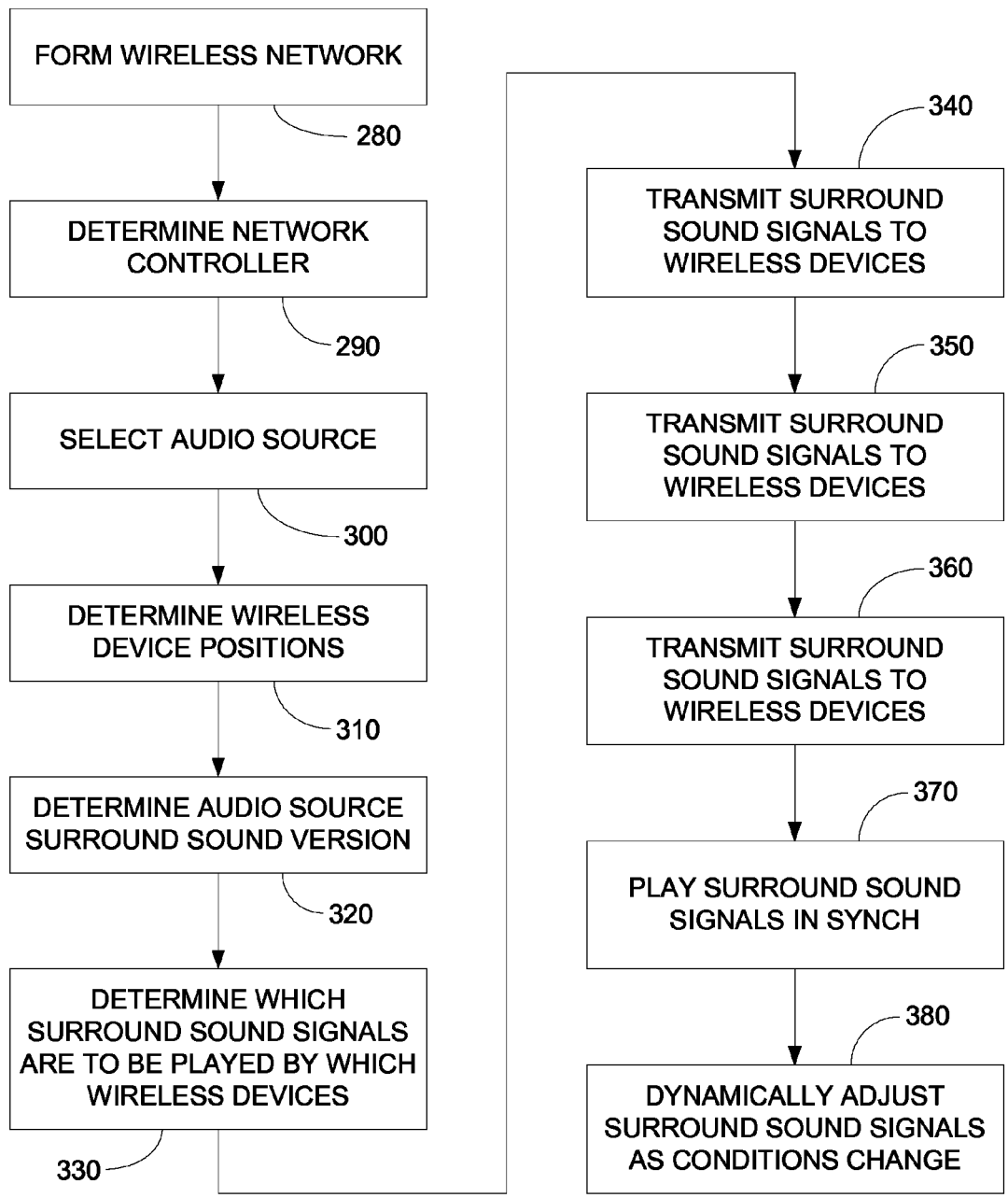
FIG. 3 is a flow chart illustrating an example embodiment of a method that provides surround sound effects from an audio source.

In an example embodiment, the processor 230, which can include internal memory (e.g., cache), and the memory 240 (e.g., nontransitory computer-readable media, RAM, ROM, flash memory, etc.) can be configured to store instructions and/or code that is executed by the processor 230 to perform one or more of the operations as set forth herein and/or as described with respect to FIG. 3. In an example embodiment, hardware, firmware, and/or software can be employed to perform the operations as set forth herein.

FIG. 3 illustrates a method that provides surround sound effects from an audio source using a plurality of wireless communication devices 110, 120, 130. The operations can be performed by the master device 110 (e.g., the processor 230 of the master device 110) and/or by the wireless communication devices 120, 130 (e.g., the processors 230 of the wireless communication device 120, 130). In addition, although FIG. 3 illustrates a particular order of the operations, an example embodiment can perform the operations in FIG. 3 or discussed anywhere herein in a different order and can add or remove operations.

In step 280, a sound system mode is activated in one of the wireless communication devices 110, 120, 130.

In step 290, a Bluetooth network, for example, is formed by the wireless communication devices 110, 120, 130. In an example embodiment, the wireless communication devices 110, 120, 130 pair up with each other. In another example embodiment, the wireless communication devices 120, 130 pair up with the master device 110.

In step 300, one 110 of the wireless communication devices 110, 120, 130 becomes a controller (e.g., a master device) of the Bluetooth network and the system 100 (e.g., the surround sound system). In an example embodiment, the wireless communication devices 120, 130 become slave devices to the master device 110 and synchronize with the master device 110.

In step 310, an audio source (e.g., a musical piece, a song, a movie, etc.) is selected, for example, at the master device 110. In an example embodiment, the other wireless communication devices 120, 130 can also select or control the selection of the audio source. Based on user settings, the wireless communication devices 120, 130 can, for example, control a playlist allowing for a social streaming experience.

In step 320, the positions of the wireless communication devices 110, 120, 130 are determined.

In step 330, the master device 110 determines or a user selects, via I/O devices 260, the surround sound version of selected audio source. The selection of the particular surround sound version can be based, for example, on the capabilities (e.g., capabilities of the speakers 140, 150, 160, capabilities of the processors 230, size of the memories 240, etc., which can be communicated to at least the master device 110 by the other wireless communication devices 120, 130, for example), the positions and/or the number of the wireless communication devices 110, 120, 130.

In step 340, the master device 110 determines which portions of the surround sound signals of the selected surround sound version of the audio source should be played by which speakers 140, 150, 160 of the wireless communication devices 110, 120, 130. For example, the master device 110 can determine which surround sound channels are to be played by which wireless communication devices 110, 120, 130. In addition, the master device 110 may determine adjust the surround sound channels in volume, frequency, filtering, etc.

In step 350, the master device 110 transmits (e.g., wirelessly transmits as a Bluetooth communication) the portions of the surround sound signals to the wireless communication devices 120, 130.

In step 360, the master device 110, which is also the wireless communication device 110, and the wireless communication devices 120, 130 play, in a synchronized manner, their surround sound portions (e.g., surround sound channels) through their respective speakers 140, 150, 160 to reproduce sound from audio source with surround sound effects.

In step 370, the master device 110 monitors the movements of the wireless communication devices 110, 120, 130 to determine if adjustments should be made in which surround sound portions should be played in which wireless communication device 110, 120, 130. In an example embodiment, the master device 110 monitors the movement of the focal point or the listener location of the system 100. In addition, the master device 110 monitors whether wireless communications devices are added or removed from the system 100 to determine if adjustments should be made. In an example embodiment, adjustments can include, for example, changing which wireless communication devices play which portions of the surround sound signal; changing volume, frequency, filtering, signal conditioning, etc. in the portions of the surround sound signal; and/or selecting a different surround sound version of the audio source.

In step 380, the master device 110 dynamically adjusts how the audio source is played by the wireless communication devices 110, 120, 130 as conditions change. In an example embodiment, changing conditions can include, for example, adding or removing wireless communication devices; roaming wireless communication devices; changing capabilities of wireless communication devices in the system 100; and/or changing a focal point or listening location of the system 100. In an example embodiment, the master device 110 can redistribute the surround sound signals in a different way to the wireless communication devices 110, 120, 130; combine or mix surround sound signals; can have some surround sound signals played by multiple wireless communication devices and/or other surround sound signals played by a single wireless communication device; and/or can adjust volume, frequency, signal conditioning, filtering, etc. of some surround sound signals.

In an example embodiment, the system 100 can enhance the positioning of the wireless communication devices in the system 100 for a particular focal point or listening location, for example. For example, the master device 110 can assist in positioning the wireless communication devices 110, 120, 130 with respect to a particular focal point or listening point. In an example embodiment, the master device 110 can assist in notifying the user of the master device 110 or the users of the wireless communication devices 120, 130 as to where to place the wireless communication devices 110, 120, 130 relative to the master device 110, a particular focal point or listening point. In an example embodiment, the master device 110 can also provide ongoing position suggestions for the wireless communication devices 110, 120, 130 to enhance surround sound effects.

In sum, wireless communication devices can form a wireless network in which music, for example, can be played on the speakers of the wireless communication devices to reproduce surround sound effects from a selected audio source. As the wireless communication devices roam with respect to each other or with respect to a focal point or listening position of the wireless network, the wireless network adjusts how the audio source is played at each speaker of the respective wireless communication device to maintain or to enhance the reproduction of surround sound effects.

While the present method and apparatus has been described with reference to certain embodiments, it will be understood by those skilled in the art that various changes may be made and equivalents may be substituted without departing from the scope of the present method and apparatus. In addition, many modifications may be made to adapt a particular situation or material to the teachings of the present disclosure without departing from its scope. Therefore, it is intended that the present method and apparatus not be limited to the particular embodiment disclosed, but that the present method and apparatus will include all embodiments falling within the scope of the appended claims.

What is claimed is:

1. A wireless communication device, comprising:
a processor configured to determine, in response to at least one movement of at least one other wireless communication device, at least one parameter about a surround sound effect, and to produce at least one signal that includes at least one item of information about at least one adjustment to be made by the at least one other wireless communication device to realize the surround sound effect at a focal point, wherein the at least one other wireless communication device includes at least one speaker configured to play at least a portion of an audio file from an audio source to realize the surround sound effect at the focal point; and
a transceiver configured to transmit the at least one signal to the at least one other wireless communication device.

2. The wireless communication device of claim 1, wherein the at least one parameter comprises the focal point.

3. The wireless communication device of claim 1, wherein the processor is further configured to dynamically adjust the at least one signal.

4. The wireless communication device of claim 1, wherein the processor is further configured to determine a version of the surround sound effect.

5. The wireless communication device of claim 4, wherein the processor is configured to determine at least one of the version of the surround sound effect based upon at least one of a capability of a processor of the at least one other wireless communication device, a capacity of a memory of the at least one other wireless communication device, a capability of a speaker of the at least one other wireless communication device, at least one location of the at least one other wireless communication device, or a number of wireless communication devices included in the at least one other wireless communication device.

6. The wireless communication device of claim 5, wherein the processor is further configured to determine at least one of that at least one of the at least one other wireless communication device has ceased to be included in a wireless network with the wireless communication device or that at least one different wireless communication device has become included in the wireless network.

7. The wireless communication device of claim 6, wherein the processor is further configured to change the version of the surround sound effect in response to a change in the number of wireless communication devices included in the at least one other wireless communication device.

8. The wireless communication device of claim 7, wherein the processor is further configured to determine that the focal point of the surround sound effect is at a location, the location being different from a location of the wireless communication device.

9. The wireless communication device of claim 8, wherein the processor is further configured to determine that the focal point of the surround sound effect is at the location, the location being different from the at least one location of the at least one other wireless communication device.

10. The wireless communication device of claim 1, wherein the processor is further configured to control a selection of the audio source.

11. The wireless communication device of claim 1, wherein the processor is further configured to access the audio source from one of the at least one other wireless communication devices.

12. The wireless communication device of claim 11, wherein the processor is configured to access the audio source from the one of the at least one other wireless communication devices in a streaming manner.

13. A method, comprising:
determining, by a processor and in response to at least one movement of at least one other wireless communication device, at least one parameter about a surround sound effect;
producing, by the processor, at least one signal that includes at least one item of information about at least one adjustment to be made by the at least one other wireless communication device to realize the surround sound effect at a focal point, wherein the at least one other wireless communication device includes at least one speaker configured to play at least a portion of an audio file from an audio source to realize the surround sound effect at the focal point; and transmitting, from a transceiver, the at least one signal to the at least one other wireless communication device.

14. A non-transitory computer-readable medium storing computer code for controlling a processor, the computer code including instructions to:

determine, in response to at least one movement of at least one other wireless communication device, at least one parameter about a surround sound effect;

produce at least one signal that includes at least one item of information about at least one adjustment to be made by the at least one other wireless communication device to realize the surround sound effect at a focal point, wherein the at least one other wireless communication device includes at least one speaker configured to play at least a portion of an audio file from an audio source to realize the surround sound effect at the focal point; and transmit the at least one signal to the at least one other wireless communication device.

15. A wireless communication device, comprising:

a transceiver configured to receive, in response to a movement of the wireless communication device, a signal;

a processor configured to determine, in response to a receipt of the signal, an adjustment to be made to the wireless communication device to realize a surround sound effect at a focal point; and a speaker configured to play at least a portion of an audio file from an audio source to realize the surround sound effect at the focal point.

16. A method, comprising:

receiving, by a transceiver of a wireless communication device and in response to a movement of the wireless communication device, a signal;

determining, by a processor of the wireless communication device and in response to a receipt of the signal, an adjustment to be made to the wireless communication device to realize a surround sound effect at a focal point; and playing, by a speaker of the wireless communication device, at least a portion of an audio file from an audio source to realize the surround sound effect at the focal point.

17. A non-transitory computer-readable medium storing computer code for controlling a processor of a wireless communication device, the computer code including instructions to:

receive, in response to a movement of the wireless communication device, a signal;

determine, in response to a receipt of the signal, an adjustment to be made to the wireless communication device to realize a surround sound effect at a focal point; and cause a speaker of the wireless communication device to play at least a portion of an audio file from an audio source to realize the surround sound effect at the focal point.

* * * * *